Figure 1:
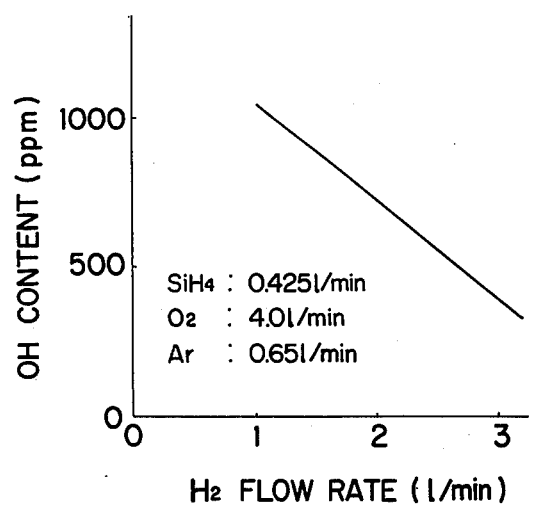

United States Patent [19]

Tokimoto et al.

[11] 4,038,370
[45] July 26, 1977

[54] METHOD OF PRODUCING HIGH-PURITY TRANSPARENT VITREOUS SILICA

[75] Inventors: Tadashi Tokimoto; Yoshinobu Hiraishi, both of Hiratsuka, Japan

[73] Assignee: Komatsu Electronic Metals Co., Ltd., Tokyo, Japan

[21] Appl. No.: 616,077

[22] Filed: Sept. 23, 1975

[30] Foreign Application Priority Data

Nov. 1, 1974 Japan .............................. 49-125564

[51] Int. Cl.$^2$ ............................................. C01B 33/12
[52] U.S. Cl. ..................................... 423/336; 423/335
[58] Field of Search ................................ 423/336, 335

[56] References Cited

U.S. PATENT DOCUMENTS 2,272,342 2/1942 Hyde ............................ 423/336 UX

*Primary Examiner*—Edward Stern
*Attorney, Agent, or Firm*—Larson, Taylor and Hinds

[57] ABSTRACT

A method of producing high-purity transparent vitreous silica by supplying to a burner a high-purity silane type gas, and an inert gas, hydrogen gas and oxygen gas to effect the flame hydrolysis, comprising growing highly pure transparent vitreous silica at a controlled atmosphere of said flame that may increase the oxygen defect concentration of the vitreous silica, and thereafter heat-treating said formed body.

6 Claims, 4 Drawing Figures

METHOD OF PRODUCING HIGH-PURITY TRANSPARENT VITREOUS SILICA

This invention relates to a method of producing a high-purity transparent vitreous silica of low water content by the flame hydrolysis of high-purity silane type gas. There are used, as the silane type gases, monosilane ($SiH_4$), dichlorosilane ($SiH_2Cl_2$), trichlorosilane ($SiHCl_3$), ), and tetrachlorosilave ($SlCl_4$). That is, the invention provides producing a vitreous silica of low OH content by forming flame of a controlled gas composition in the flame hydrolysis to increase oxygen defect in vitreous silica and form a metastable OH and by heat treatment vitreous silica to discharge the metastable OH.

Conventionally, synthetic vitreous silica is generally produced by flame hydrolysis method of silicon halide (silicon tetrachloride in general), but oxyhydrogen flame must be employed to obtain a stable flame of more than 1700° C, and thus formed vitreous silica ($SiO_2$) contains OH of 1000–2000 ppm owing to the water ($H_2O$) by-produced at that time and the hydrogen ($H_2$) in an equilibrium state with the water. In the spectroscopic measurement of the formed vitreous silica it is found that at wave length $2.73\mu$ there is a strong absorption caused by the OH stretching vibration and that even overtones show an absorption at their respective strength rates.

Recently, it has been tried in various places to use high-purity transparent vitreous silica as a material of optical fiber for communication, but the problem is the optical transmission losses in the wave length range $0.5$–$1.2\mu$. In the case of using high water content synthetic vitreous silica, an influence of the absorption due to OH, which is referred to earlier, exerts as overtones in the vidual region used in optical communication so that the overtones become a major cause for the optical transmission losses.

These days, there has been proposed, as a method of obtaining high-purity transparent vitreous silica of extremely small water content, a method in which silicon tetrachloride ($SiCl_4$) is directly oxidized by oxygen in a plasma state, but mass production by this method is not easy because of the demerits that a great amount of electric power is required and the growing rate of synthetic vitreous silica is remarkably slow so as to produce low production efficiency.

The present invention has been made as a result of having effected various experiments and studies to dissolve said demerits, and it provides a method of producing high-purity transparent vitreous silica of low water content at extremely speedier growing rate compared with convention method. That is, the invention is concerned with a method of producing high-purity transparent vitreous silica by supplying to a burner a high-purity silane type gas, and an inert gas, hydrogen gas and oxygen gas to effect the flame hydrolysis, comprising forming high-purity and tetrachlorosilane ($SiCl_4$). vitreous silica by carrying out the flame hydrolysis retaining the flow rate of said hydrogen gas for forming the flame of said flame hydrolysis at least 6 times the flow rate of said high-purity silane type gas, and retaining the flow rate of said oxygen gas below a thoretial supply flow rate required for completely oxidizing the silicon in said high-purity silane type gas and the hydrogen existing during said flame hydrolysis; and heat-treating the formed body at a temperature of more than 800° C.

To explain first in brief the behavior of the water in vitreous silica to understand the present invention, it is considered that in the vitreous silica which is obtained by flame melting crushed natural quartz there exists the following equilibrium reaction:

$$OH + V_o \rightleftarrows Si(-O-) + \tfrac{1}{2}H_2 \quad (1)$$

$V_o$ . . . oxygen defect, (—O—) . . . bridging oxygen atoms

Further, it is known that in vitreous silica there exist metastable OH and permanent OH, that most of the OH in synthetic vitreous silica are permanent OH and that in the permanent OH influence of vacuum degasing is scarcely noticed. Moreover, it is one consideration that with regard to the formation of OH by hydrogen gas, permanent OH may be formed by interaction between the nonbridging oxygen atoms in vitreous silica and hydrogen. Accordingly, the $V_o$ in said formula (1) is an oxygen defect in vitreous silica, and the existence of $V_o$ and that of nonbridging oxgen atoms (excess oxygen atoms) are not compatible. In addition, if $V_o$ exists not permanent OH but metastble OH is formed. That is, to lessen the OH content in the vitreous silica it will be required to introduce an oxygen defect into the vitreous silica to make metastable OH.

Figure 2:
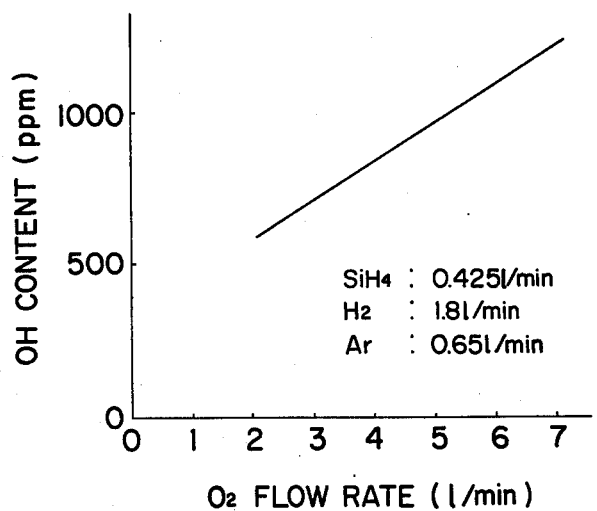
Figure 3:
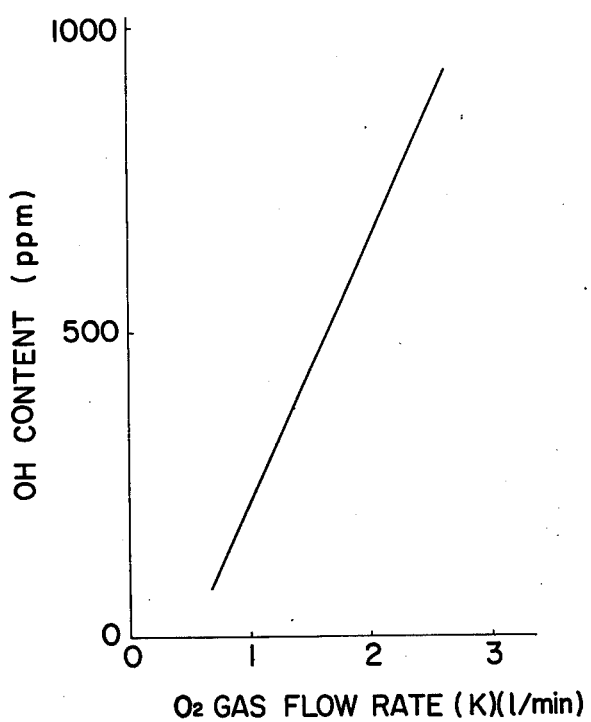
Figure 4:
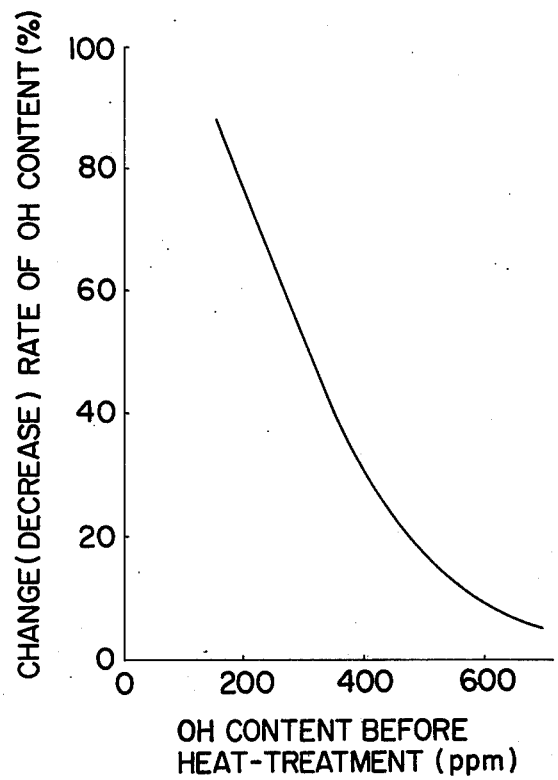

This invention has been achieved by varying the gas composition which pertains to the reactions in the flame hydrolysis to metastabilize the OH in the vitreous silica. For example, FIGS. 1 to 4 explain the cases where flame hydrolysis was effected with monosilane ($SiH_4$) gas. FIG. 1 shows a OH content change of vitreous silica in the case of supplying constant flow rates of monosilane, oxygen gas and argon gas and varying the flow rate of hydrogen gas only, and the more the hydrogen gas flow rate was supplied, the more the OH content decreased. FIG. 2 shows a OH content change of vitreous silica in the case of supplying silane gas, hydrogen gas and argon gas at constant flow rates and varying the flow rate of oxygen gas, and the less the oxygen gas flow rate was fed, the more the OH content decreased. FIG. 3 shows a OH content change of the formed vitreous silica in case vitreous silica was formed by varying the ratio between the oxygen flow rate which flowed in when practically flame hydrolyzing and a theoretical oxygen flow rate which was required to completely oxidize the substances (silicon and hydrogen) to be oxidized in the reaction system, i.e. the ratio between the oxygen flow rate which practically flows in and a theoretically required oxygen flow rate, which ratio being equal to K, on the basis of the results of FIGS. 1 and 2, when the hydrogen flow rate was supplied by more than 6 the monosilane flow rate. From this result, the less the value of K was made, the more the OH content in the formed vitreous silica decreased. FIG. 4 shows a checked change of the OH content by a heat treatment (at a nitrogen gas atmosphere at 1050° C) to know whether or not the OH of said formed vitreous silica is in a metastable state. With respect to the hydroxyl concentrations of less than about 500ppm a decrease of the hydroxyl concentration has been noticed after a heat treatment of only 20–24 hours, and the lower the hydroxyl concentration is before the heat treatment, the more remarkably it decreased. That is, a conspicuous effect has been noticed in case the hydrogen flow rate as shown in FIG. 1 is more than 6 times the flow rate of high-purity monosilane gas (the hydroxyl concentration in the formed vitreous silica is below about 500 ppm), and the value of said K is less than 1.5. In other words, it is presumed that the hydroxyls in which the hydroxyl concentration in the vitreous silica (before heat treatment) is approximately less than 500 ppm have become metastable.

The invention has been explained above in detail in an example where high-purity monosilane gas is employed, but it will be easily understood by those skilled in the art that the invention is applicable even in the case of using halides of silicon.

As detailed above, according to the present invention, the OH content in the formed vitreous silica can be remarkably decreased by making the OH in the vitreous silica metastable in such procedures that the flow rate of hydrogen gas in the flame hydrolysis of high-purity silane type gas is made more than 6 times the flow rate of said high-purity silane type gas and that the content of oxygen defect in the formed vitreous silica is increased by lessening the flow ratio K of oxygen gas or the content of nonbridging (excess) oxygen is diminished; and further by heat treatment the metastable OH to discharge it. It will thus greatly contribute to the development in the optical communication field that the OH is in the vitreous silica can be made metastable, the vitreous silica being easily formed only by changing the gas composition in the flame hydrolysis of high-purity silane type gas, and that highly pure transparent vitreous silica having low OH content can be easily mass produced by mere heat treatment for a short time.

FIG. 1 is a graph showing the OH content in formed vitreous silica in the case of varying the hydrogen gas flow rate in the flame hydrolysis, in which graph the axis of ordinate represents the OH content and the axis of abscissa the hydrogen gas flow rate FIG. 2 is a graph showing the OH content in the formed vitreous silica in these of varying the oxygen gas flow rate in said flame hydrolysis, in which graph the axis of ordinate represents the OH content and the axis of abscissa the oxygen gas flow rate. FIG. 3 is a graph showing the OH content in the formed vitreous silica in the case of retaining the hydrogen gas flow rate in said flame hydrolysis more than 6 times the monosilane gas flow rate and varying the ratio K of the oxygen flow rate, in which graph the axis of ordinate represents the OH content and the axis of abscissa the ratio K of the oxygen flow rate. FIG.4 is a graph showing a change (decrease) of the OH content in said vitreous silica after a heat treatment of formed vitreous silica, in which graph the axis of ordinate represnts the change (decrease) rate of said OH content and the axis of absicssa the OH content in the vitreous silica before a heat treatment of said silica.

EXAMPLE 1

High-purity transparent vitreous silica having 9 mm in diameter and 100 mm in length was formed in such manner that there were fed to a burner nozzle, from the center of the concentrical, cylindrical burner having a configuration of approximately 30 mm, 0.5 $l$/min plus 4.2 $l$/min of monosilane gas and hydrogen gas, 0.5 $l$/min of argon gas and 2.8–2.9 $l$/min of oxygen gas in that order, and said vitreous silica was formed at the end portion of a master rod supported by a rotatably driving holder. It was found that the value was 180 ppm in calculating the hydroxyl concentration of said vitreous silica from a transmission curve of infrared spectrum. Further, said vitreous silica was heat treated for about 40 hours at the temperature of 1050° C in a nitrogen gas atmosphere to find that the hydroxyl concentration in said vitreous silica was reduced to 40 ppm.

EXAMPLE 2

There was carried out a flame hydrolysis, with a burner of the same type as in Example 1, to 5 $l$/min of hydrogen saturated with silicon tetrachloride ($SiCl_4$), 0.5 $l$/min of helium gas and 2.5–3 $l$/min of oxygen gas. As a result, there could be formed a highly pure transparent vitreous silica at the growing rate 0.1 mm/min, which silica having 10 mm in diameter and 50 mm in length. It was found that the value was 200 ppm in calculating the hydroxyl concentration of said vitreous silica from a transmission curve of infrared spectrum. Further, said vitreous silica was heat-treated for about 40 hours at the temperature of 1050° C in an argon gas atmosphere to find that hydroxyl concentration in said vitreous silica was redued to 60 ppm.

What is claimed is:

1. A method of producing high-purity transparent vitreous silica by supplying to a burner a high purity silane type gas, and an inert gas, hydrogen gas and oxygen gas to effect flame hydrolysis, comprising forming a high-purity transparent vitreous silica which contains metastable OH of less than 500 ppm through flame hydrolysis while maintaining the flow rate of said hydrogen gas at least more than six times the flow rate of said high-purity silane type gas and maintaining the rate of said oxygen gas less than 1.5 times a theoretical supply flow rate required to oxidize completely the silicon in said high-purity silane type gas and the hydrogen which exists when effecting said flame hydrolysis, and heat-treating the transparent vitreous silica obtained at a temperature higher than 800° C. in an inert gas atmosphere for more than 20 hours to reduce the OH content of said transparent vitreous silica to the range from 40 to 60 ppm.

2. A method of claim 1 wherein the high-purity transparent vitreous silica containing metastable OH obtained by the flame hydrolysis is heat-treated at a temperature from 800° C to 1050°C.

3. A method of claim 1 wherein the high-purity transparent vitreous silica obtained by the flame hydrolysis is heat-treated for 20–40 hours.

4. A method of producing high-purity transparent vitreous silica in accordance with claim 1 wherein the inert gas is argon gas or helium gas.

5. A method of producing high-purity transparent vitreous silica in accordance with claim 1 wherein there are used, as the silane type gases, monosilane ($SiH_4$), dichlorosilane ($SiH_2Cl_2$) and trichlorosilane ($SiHCl_3$), tetrachclorosilane ($SiCl_4$).

6. A method of producing high-purity transparent vitreous silica in accordance with claim 1 wherein the heat treatment is carried out an nitrogen gas or argon gas atmosphere.

* * * * *